United States Patent
Majer (10) Patent No.: US 9,487,309 B2
(45) Date of Patent: Nov. 8, 2016

(54) ECCENTRICITY CONTROL FOR GEOSYNCHRONOUS SATELLITES

(71) Applicant: Kratos Integral Holdings, LLC, San Diego, CA (US)

(72) Inventor: Vaclav Majer, Monterey, VA (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 342 days.

(21) Appl. No.: 14/282,717

(22) Filed: May 20, 2014

(65) Prior Publication Data

US 2014/0339368 A1 Nov. 20, 2014

Related U.S. Application Data

(60) Provisional application No. 61/825,436, filed on May 20, 2013.

(51) Int. Cl.
*B64G 1/24* (2006.01)
*G05D 1/08* (2006.01)

(52) U.S. Cl.
CPC .............. *B64G 1/242* (2013.01); *G05D 1/0883* (2013.01)

(58) Field of Classification Search
CPC ................................ B64G 1/242; G05D 1/0883
See application file for complete search history.

(56) References Cited

U.S. PATENT DOCUMENTS

| | | | |
|---|---|---|---|
| 6,305,646 B1 | 10/2001 | McAllister et al. | |
| 6,457,679 B1 * | 10/2002 | Ebert | B64G 1/242 244/158.6 |
| 6,672,542 B2 * | 1/2004 | Peterson | B64G 1/26 244/158.6 |
| 8,448,903 B2 * | 5/2013 | Majer | B64G 1/26 244/158.6 |
| 9,004,408 B2 * | 4/2015 | Majer | B64G 1/26 244/158.4 |
| 2002/0036250 A1 * | 3/2002 | Ebert | B64G 1/242 244/158.6 |
| 2003/0222179 A1 * | 12/2003 | Peterson | B64G 1/26 244/158.6 |
| 2008/0029650 A1 * | 2/2008 | Kawaguchi | B64G 1/1007 244/158.4 |
| 2008/0105788 A1 * | 5/2008 | Anzel | B64G 1/26 244/169 |
| 2012/0181386 A1 | 7/2012 | Majer | |
| 2012/0181387 A1 | 7/2012 | Majer | |
| 2012/0187250 A1 | 7/2012 | Majer | |

FOREIGN PATENT DOCUMENTS

WO 2008/118140 A2 10/2008

OTHER PUBLICATIONS

Pocha, J. J., An Introduction to Mission Design for Geostationary Satellites. Dordrecht: Springer Netherlands, 1987. Print. Chapter 6.*
International Search Report and Written Opinion for related PCT application No. PCT/US2014/038733, mailed on Feb. 3, 2015.

* cited by examiner

*Primary Examiner* — Joseph W Sanderson
(74) *Attorney, Agent, or Firm* — Procopio, Cory, Hargreaves & Savitch, LLP

(57) ABSTRACT

Eccentricity control for a geosynchronous satellite includes: setting initial conditions, duration, and schedule for the eccentricity control; defining a plurality of parameters including control loci for centroid, semi-major axis, semi-minor axis, uncontrolled eccentricity radius, right ascension of ascending node, and inclination, wherein the plurality of parameters are defined such that when the eccentricity control is applied, a mean geodetic longitude of the geosynchronous satellite is maintained within a predefined distance from a station longitude.

20 Claims, 7 Drawing Sheets

ECCENTRICITY CONTROL FOR GEOSYNCHRONOUS SATELLITES

CROSS-REFERENCE TO RELATED APPLICATIONS

This application claims the benefit of priority under 35 U.S.C. §119(e) of U.S. Provisional Patent Application No. 61/825,436, filed May 20, 2013, entitled "Eccentricity Control for Geosynchronous Satellites." The disclosure of the above-referenced application is incorporated herein by reference.

BACKGROUND

Field of the Invention

The present invention relates to geosynchronous satellites, and more specifically, to an eccentricity control of a geosynchronous satellite.

Background

Managing orbital degradation of geosynchronous satellites over time is an on-going problem. Because of various external forces, such as forces exerted by the sun and the moon, it is necessary to correct for this degradation in order to extend the lifetime of satellites to a maximum span. Because the lifetime of a satellite depends on how long its supply of fuel lasts, any saved fuel may be used to extend the life of the satellite.

SUMMARY

The present invention provides for eccentricity control of a geosynchronous satellite.

In one implementation, a method of eccentricity control for a geosynchronous satellite is disclosed. The method includes: setting initial conditions, duration, and schedule for the eccentricity control; defining a plurality of parameters including control loci for centroid, semi-major axis, semi-minor axis, uncontrolled eccentricity radius, right ascension of ascending node, and inclination, wherein the plurality of parameters are defined such that when the eccentricity control is applied, a mean geodetic longitude of the geosynchronous satellite is maintained within a predefined distance from a station longitude.

In another implementation, an apparatus for eccentricity control of a geosynchronous satellite is disclosed. The apparatus includes: means for setting initial conditions, duration, and schedule for the eccentricity control; means for defining a plurality of parameters including control loci for centroid, semi-major axis, semi-minor axis, uncontrolled eccentricity radius, right ascension of ascending node, and inclination, wherein the plurality of parameters are defined such that when the eccentricity control is applied, a mean geodetic longitude of the geosynchronous satellite is maintained within a predefined distance from a station longitude.

In a further implementation, a non-transitory computer-readable storage medium storing a computer program for eccentricity control of a geosynchronous satellite is disclosed. The computer program includes executable instructions that cause a computer to: set initial conditions, duration, and schedule for the eccentricity control; define a plurality of parameters including control loci for centroid, semi-major axis, semi-minor axis, uncontrolled eccentricity radius, right ascension of ascending node, and inclination, wherein the plurality of parameters are defined such that when the eccentricity control is applied, a mean geodetic longitude of the geosynchronous satellite is maintained within a predefined distance from a station longitude.

Other features and advantages of the present invention will become more readily apparent to those of ordinary skill in the art after reviewing the following detailed description and accompanying drawings.

DETAILED DESCRIPTION

As described above, managing orbital degradation of geosynchronous satellites over time is an on-going problem, and it is necessary to correct for this degradation in order to extend the lifetime of satellites to a maximum span. Accordingly, what is needed is a way to provide design and implementation of eccentricity control strategies.

Certain implementations as described herein provide for eccentricity-inclination-sun synchronous eccentricity (HK) control for geosynchronous satellites in both equatorial and inclined orbits. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Figure 1:
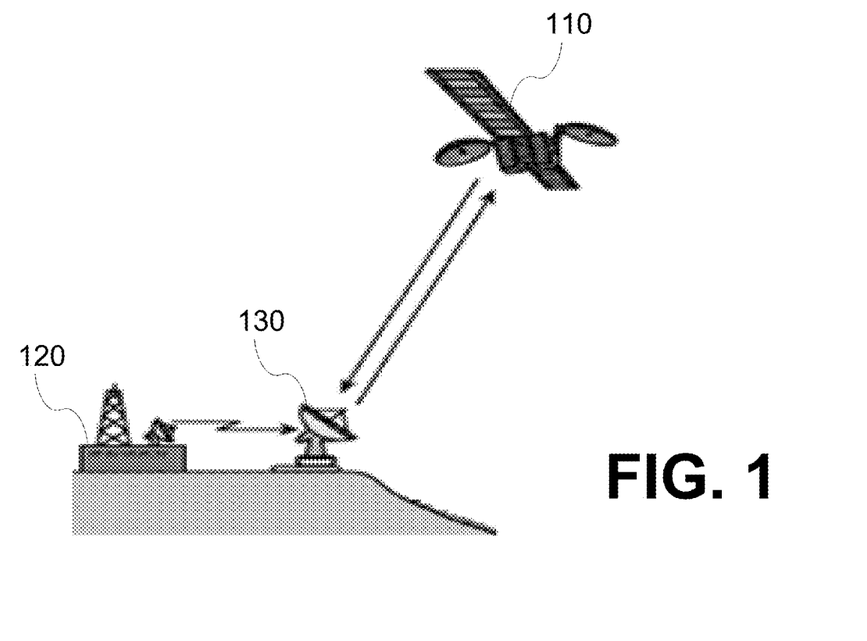
FIG. 1 illustrates a geosynchronous satellite in communication with a base station via a base station antenna.

As illustrated in FIG. 1, a geosynchronous satellite 110 may be in communication with one or more base stations 120 via base station antennas 130 and may transmit and receive data and receive operational commands.

Figure 2:
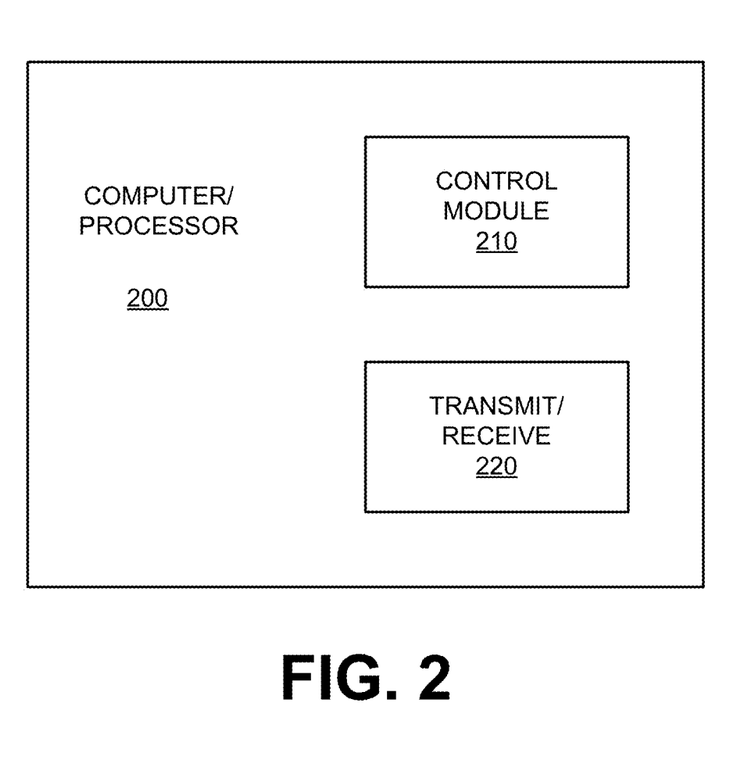
FIG. 2 is a functional block diagram of a computer system configured to provide for eccentricity-inclination-sun synchronous eccentricity (HK) control for a geosynchronous satellite in both equatorial and inclined orbits in accordance with one embodiment of the present invention.

FIG. 2 is a functional block diagram of a computer system 200 configured to provide for eccentricity-inclination-sun synchronous eccentricity (HK) control for a geosynchronous satellite in both equatorial and inclined orbits in accordance with one embodiment of the present invention. In the illustrated embodiment of FIG. 2, a base station 120 and/or the geosynchronous satellite 110 may include a computer and/or processor unit 200 including a module 210 configured to implement Eccentricity-Inclination-Synchronous-Station-Keeping (EISK) eccentricity-inclination-sun synchronous control and a transmit/receive module 220 for communication. Alternatively or additionally, the geosynchronous satellite 110 may include a computer and/or processor unit or module configured to implement EISK eccentricity-inclination-sun synchronous control.

A beginning-of-life (BOL) inclined orbit scenario and a middle-of-life (MOL) equatorial orbit scenario are each subject to two instances of EISK eccentricity control. The first instance emulates Node-Synchronous Station Keeping (eNSSK) node-synchronous eccentricity control using the Eccentricity-Inclination-Synchronous-Station-Keeping (EISK) implementation, while the second instance offers a minimum fuel alternative to the maximum compensation strategy. Thus, the first instance provides a maximum compensation control (eNSSK), while the second instance provides a minimum fuel control (EISK). The BOL scenarios demonstrate that eNSSK node-synchronous HK control may be rendered as a special case of EISK, and that EISK configured for minimum fuel consumption offers significant fuel savings over the maximum compensation strategy. The MOL scenarios demonstrate that EISK offers a seamless and fuel-optimal continuously variable transition between BOL and end-of-life (EOL) inclined orbit operations and MOL equatorial operations.

Term Node-Synchronous Station Keeping (NSSK) refers to an open loop control algorithm for eccentricity control in geosynchronous inclined orbit, which only applies control deltas orthogonal to the inclined orbit line of nodes. In contrast, term EISK is a closed loop control which represents a major departure from NSSK.

As for each of the EISK control space, longitude and drift (LD), eccentricity (HK), and inclination (PQ), the station keeping (SK) control locus paradigm defines a desired continuously-controlled mean element locus which is then rendered in practice by episodic discrete control impulses. The LD is the in-orbit phase of satellite and its rate of change, the HK is the shape and orientation of orbit ellipse, and the PQ is the orientation of the orbit plane in inertial space. The control schedules and control loci are operator-defined. In particular, the EISK HK control locus is an ellipse in the HK vector plane and the ellipse centroid and semi-axis lengths and orientations are operator defined. One or both control locus semi-diameters may be zero.

Accordingly, the station keeping function manages six orbital elements in three pairs: longitude and drift (LD), eccentricity trajectories (HK), and inclination (PQ). The LD is the in-orbit phase of satellite and its rate of change, the HK is the shape and orientation of orbit ellipse, and the PQ is the orientation of the orbit plane in inertial space. Thus, the orbital elements are defined as follows:

$H = E \cos(w+W)$;
$K = E \sin(w+W)$;
$w$ = argument of perigee;
$E$ = magnitude of eccentricity;
$P = 2 \tan(I/2) \cos(W)$;
$Q = 2 \tan(I/2) \sin(W)$;
$I$ = magnitude of inclination; and
$W$ = right ascension of ascending node of the satellite orbit.

A BOL inclined orbit scenario, subject to eNSSK (maximum compensation control) and EISK (minimum fuel control) eccentricity controls, is illustrated in and described with respect to FIGS. 3A, 3B, 4A, 4B, 5A, 5B. The objective of the BOL inclined orbit scenario is to control the eccentricity vector relative to both the inclination of the orbit and the right ascension of the solar pressure eccentricity perturbation in such a manner that the mean geodetic longitude of a satellite remains within 50 mdeg of its desired operating station longitude when the satellite is within 50 mdeg latitude of the equator. These simulations hold mean geodetic longitude (MGL) continuously at the station longitude in order to restrict the analysis to the management of osculating geographic longitude through the eccentricity control.

The BOL configuration settings common to the two control instances are as follows:

1) Initial Conditions
   $t0 = 14.25 \ast 365.25$ (BOL 2nd Q 2014);
   $h0 = 0$ (initial eccentricity h)
   $k0 = 0$ (initial eccentricity k)
2) Duration and Schedule
   $T = [t0:1:t0+366]$ (1 year simulation, daily step);
   $mP = 7$ (D&E maneuver period, days);
   $mS = [T(1)+mP:mP:T(end)]$ (D&E maneuver schedule, days)
3) Control Locus Definition
   $H = 0$ (control locus centroid ecc h, micros);
   $K = 0$ (control locus centroid ecc k, micros);
   $E = 350$ (control locus semi-major axis, micros);
   $F$ = control specific (control locus semi-minor axis, micros), wherein $F = 0$ or 200;
   $G = 350$ (uncontrolled ecc radius, micros)
   $W = 294$ (BOL raan, deg)
   $i = 6$ (BOL inclination, deg).

Figure 3A:
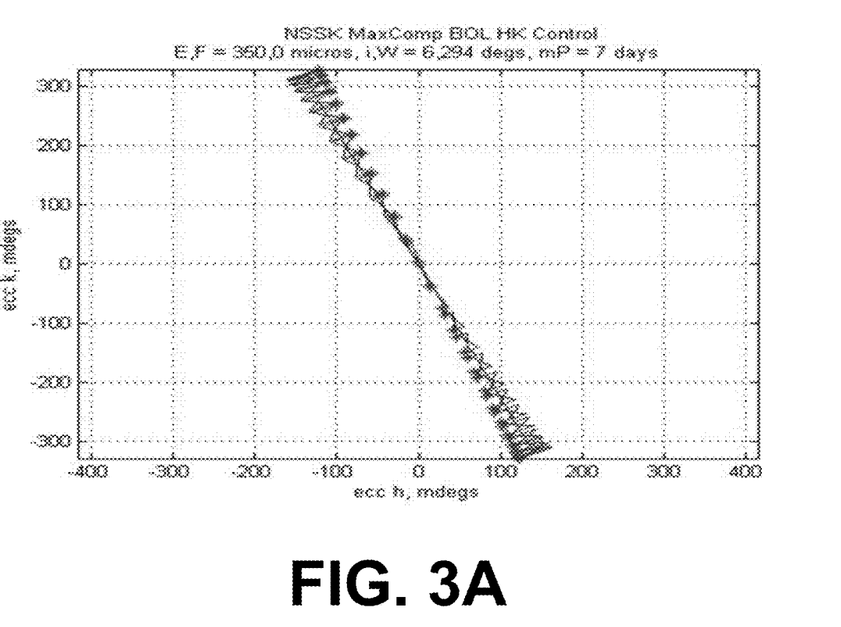
FIG. 3A illustrates an HK plot for BOL eNSSK Control Locus.
Figure 3B:
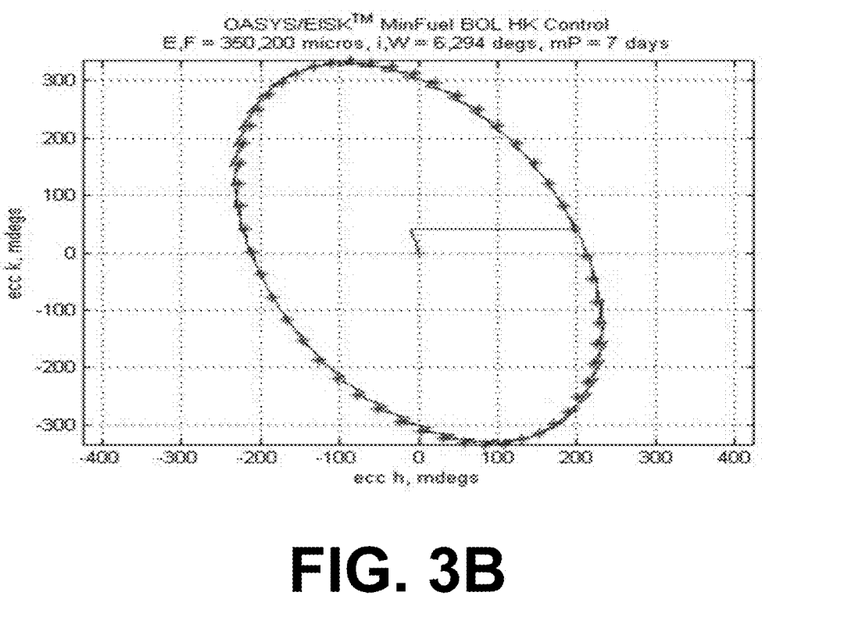
FIG. 3B illustrates an HK plot for BOL EISK Control Locus.

The two instances are distinguished only by the value of F, the semi-minor axis of the control locus. That is, when F=0, maximum compensation control (eNSSK) is selected, while when F=200, EISK minimum fuel control is selected. The sun is approximately at the vernal equinox (raSun=10 deg) at t0=2014.25 (the BOL simulation start date).

FIG. 3A illustrates an HK plot for BOL eNSSK Control Locus. In the illustrated example of FIG. 3A, the half-length of BOL eNSSK control locus is 350 micros (the vehicle's uncontrolled eccentricity radius—straight green line), and is centered on the HK origin and aligned with the orbit inclination vector. Also shown are the weekly control deltas (orthogonal to the control locus, in red), with an asterisk at the post-maneuver target [h, k]. An initialization maneuver to acquire the control is negligibly small. The inter-maneuver uncontrolled eccentricity coast segments are shown in blue. There are four time-ordered sequences of maneuvers: (1) outbound from the origin to the northwest; (2) inbound to the origin from the northwest; (3) outbound from the origin to the southeast; and (4) inbound to the origin from the southeast. The north and southbound maneuvers are slightly out of phase, which causes the maneuvers to appear in apparent pairs. The maneuvers of each apparent pair are 26 weeks apart and minimal magnitude at the control locus centroid and one week apart and maximal magnitude at the control locus poles.

FIG. 3B illustrates an HK plot for BOL EISK Control Locus. In the illustrated example of FIG. 3B, the EISK control locus is a green ellipse having semi-major axis of 350 micros aligned with the orbit inclination vector, and semi-minor axis of 200 micros. The ellipse centroid is at the HK origin. The weekly control deltas intersect the green target locus at continuously varying angle, are shown in red, and have a red asterisk at the post-maneuver target [h, k]. Maneuver magnitudes are minimal when the sun is aligned with the minor axis of the control locus and maximal when the sun is aligned with the major axis of the control locus. The inter-maneuver uncontrolled eccentricity coast segments are blue. The maneuver sequence begins with a large initialization maneuver to [h, k]~(200, 50) and then follows the sun along the green target locus.

Figure 4A:
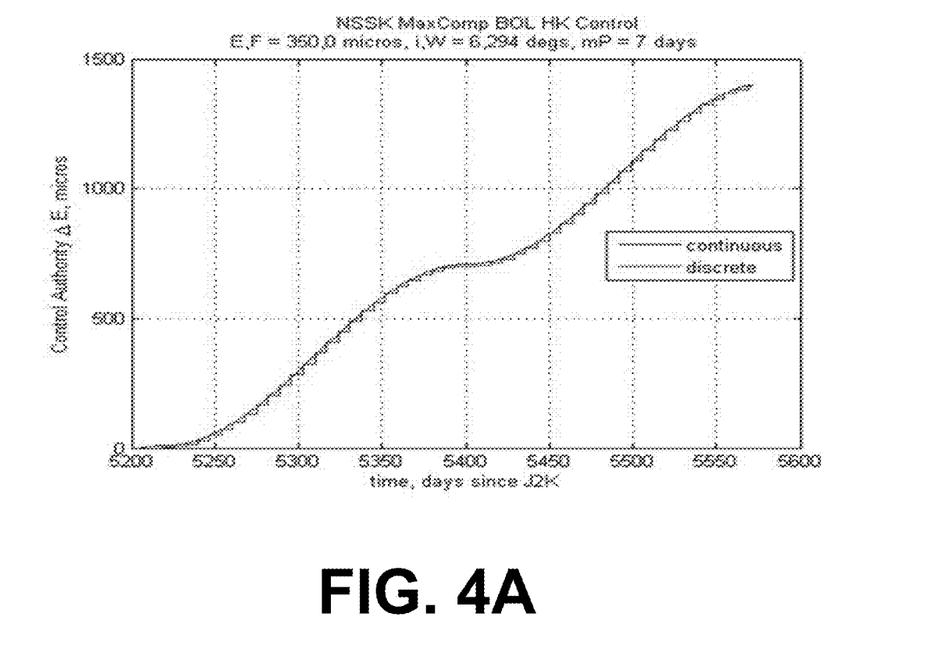
FIG. 4A illustrates a control authority plot for BOL eNSSK.

FIG. 4A illustrates a control authority plot for BOL eNSSK. In the illustrated example of FIG. 4A, the cumulative annual eNSSK continuous and discrete magnitude of correction (ΔE) of eccentricity control authorities are ~1400 micros, with mean per-weekly-maneuver ΔE authority of ~27 micros/maneuver. Maneuver magnitudes are minimal when the sun vector is orthogonal to the target locus and maximal when the sun vector is aligned with the target locus.

Figure 4B:
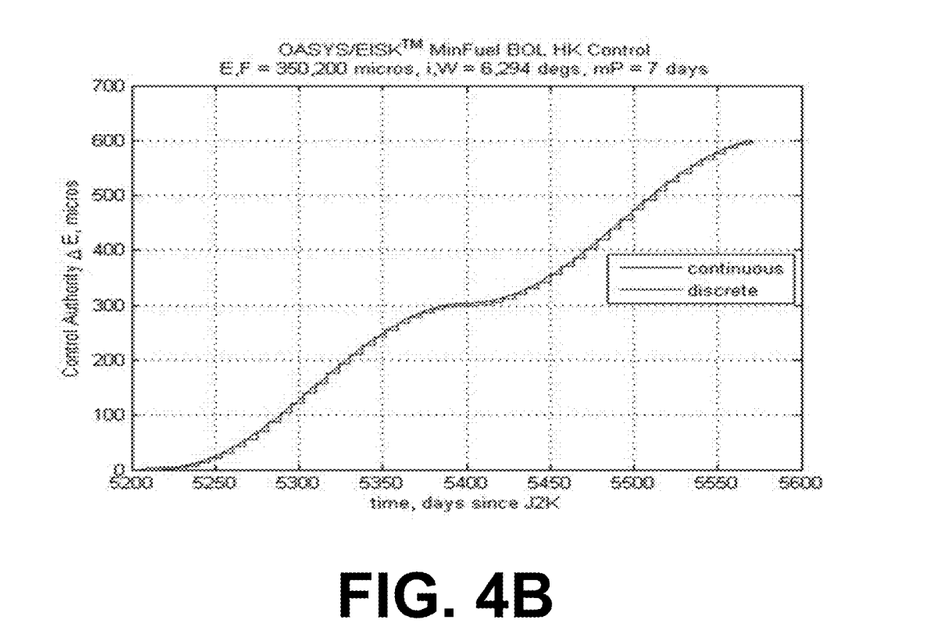
FIG. 4B illustrates a control authority plot for BOL EISK.

FIG. 4B illustrates a control authority plot for BOL EISK. In the illustrated example of FIG. 4B, the cumulative annual EISK continuous and discrete ΔE eccentricity control authorities are ~600 micros, with mean per-weekly-maneuver ΔE authority of ~11.5 micros/maneuver. Maneuver magnitudes are minimal when the sun vector is orthogonal to the target locus minor axis and maximal when the sun vector is aligned with the target locus major axis. The EISK/eNSSK ΔE control authority demand ratio is 43%.

Figure 5A:
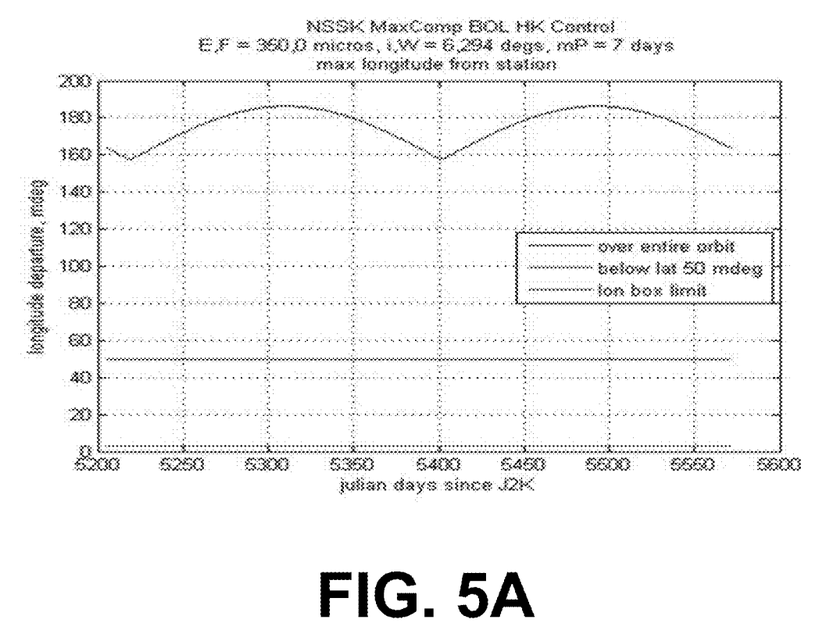
FIG. 5A illustrates a longitude limit plot for BOL eNSSK.

FIG. 5A illustrates a longitude limit plot for BOL eNSSK. In the illustrated example of FIG. 5A, the blue trace records the daily maximum longitude departure from the station during the BOL year. The maximum departures for the eNSSK control fall between 158 mdeg and 190 mdeg. The red trace marks the 50 mdeg longitude departure limit for vehicle latitudes within 50 mdeg of the equator. The green trace records the daily maximum longitude departure for latitudes within 50 mdeg of the equator. The eNSSK control holds the daily maximum longitude departures from station for the near-equator latitudes at ~3 mdeg, providing an MGL control margin of ~47 mdeg year-round.

Figure 5B:
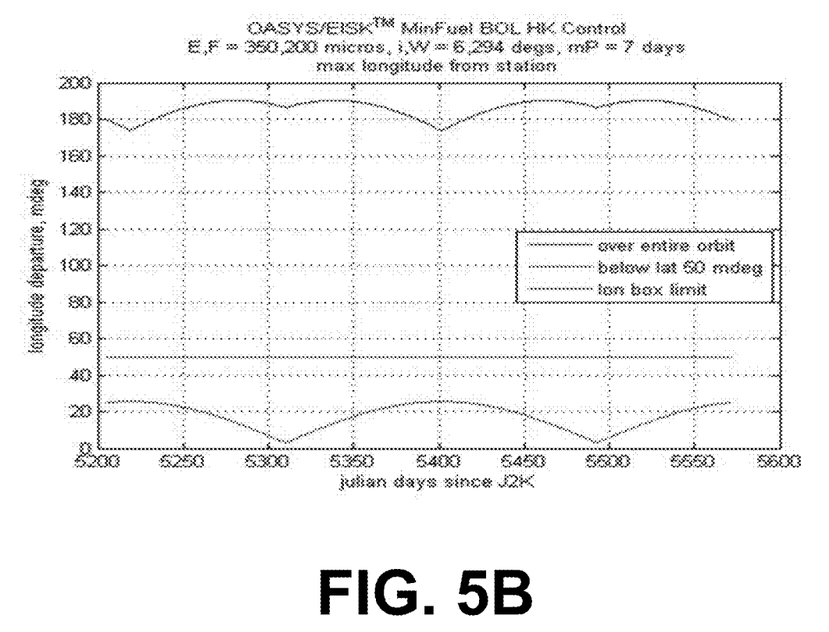
FIG. 5B illustrates a longitude limit plot for BOL EISK.

FIG. 5B illustrates a longitude limit plot for BOL EISK. In the illustrated example of FIG. 5B, the EISK daily maximum departures over all latitudes (in blue) are between 178 mdeg and 190 mdeg, the upper limit agreeing with that for the eNSSK control. The daily maximum departures for latitudes below the 50 mdeg latitude limit [green] are between 3 mdeg and 23 mdeg, providing an MGL control margin of at least 27 mdeg year round.

In conclusion regarding the BOL eccentricity control, the eNSSK max compensation control (as configured for this BOL inclined orbit scenario) provides a 47 mdeg MGL control margin year round, which is nearly the entire longitude slot radius. A typical MGL control margin for a 50 mdeg slot is 25 mdeg or less. The annual eccentricity control authority demand of the eNSSK control is 1400 micros. Further, the EISK minimum fuel control (as configured for this BOL inclined orbit scenario) provides at least 27 mdeg MGL control margin for the 50 mdeg radius slot. The annual eccentricity control authority demand of the control is 600 micros, 43% of the eNSSK demand. Decreasing the EISK semi-minor axis from 200 micros to 100 micros increases the year round minimum MGL control margin from 27 mdeg to 35 mdeg at the cost of increasing the eccentricity control authority demand from 600 micros to 1000 micros, 71% of the eNSSK demand.

A MOL equatorial orbit scenario subject to eNSSK (maximum compensation control) and EISK (minimum fuel control) eccentricity controls is illustrated and described with respect to FIGS. 6A, 6B, 7A, 7B, 8A, 8B. Even though eNSSK is not intended for equatorial orbit operations, it is interesting to compare its performance to EISK configured for standard sun synchronous eccentricity control equatorial operations. The objective is to control the eccentricity vector relative to the right ascension of the solar pressure eccentricity perturbation in such a manner that the geodetic longitude always remains within 50 mdeg of station longitude. These simulations hold MGL mean geodetic longitude continuously at the station longitude in order to restrict the analysis to the management of osculating geographic longitude through the eccentricity control.

The MOL configuration settings common to the two control instances are as follows:
1) Initial Conditions
    t0=21.75*365.25 (MOL 3rd Q 2021);
    h0=0 (initial eccentricity h);
    k0=0 (initial eccentricity k);
2) Duration and Schedule
    T=[t0:1:t0+366] (1 year simulation; daily step);
    mP=7 (D&E maneuver period, days);
    mS=[T(1)+mP:mP:T(end)] (D&E maneuver schedule, days)
3) Control Locus Definition
    H=0 (control locus centroid ecc h, micros);
    K=0 (control locus centroid ecc k, micros);
    E=control specific (control locus semi-major axis);
    F=control specific (control locus semi-minor axis);
    G=350 (uncontrolled ecc radius, micros);
    W=0 (MOL raan, deg);
    i=0.100 (MOL inclination, deg).

Figure 6A:
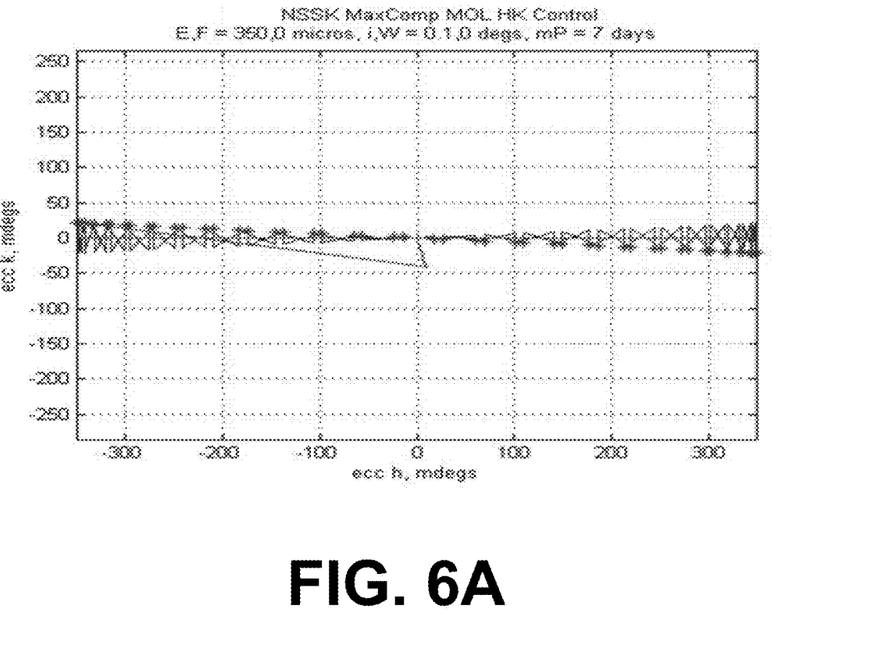
FIG. 6A illustrates an HK plot for MOL eNSSK Control Locus, which is identical in size and structure to the BOL locus.
Figure 6B:
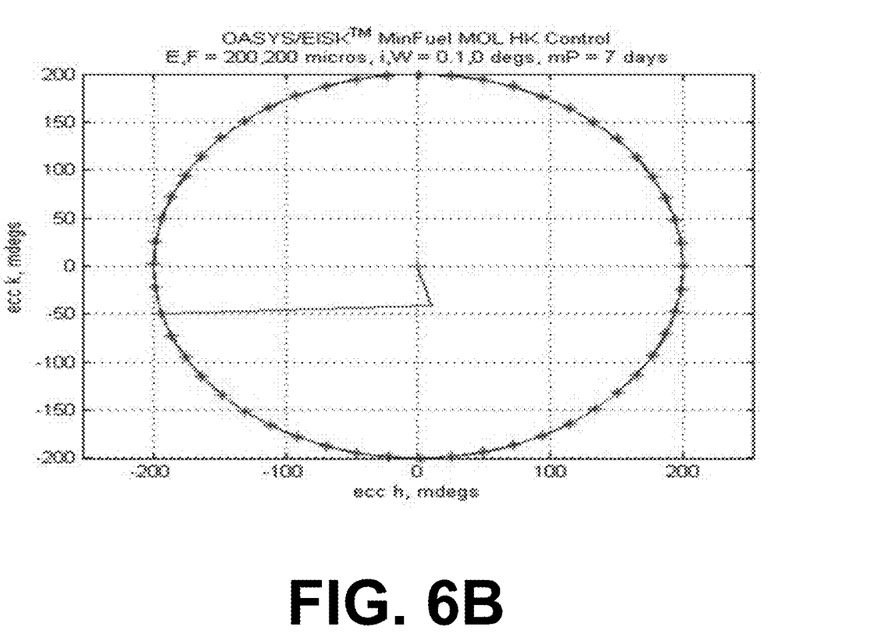
FIG. 6B illustrates an HK plot for MOL EISK Control Locus.

The MOL inclination represents a near-miss of the inclination vector origin by 100 mdeg in the direction of the vernal equinox. The two controls are distinguished only by the values of E and F, the semi-axes of the control locus. In one case for eNSSK maximum compensation control, E=350 and F=0. In one case for EISK minimum fuel sun synchronous control circular radius, E=200 and F=200. The sun is approximately in the autumnal equinox (raSun=190 deg) at t0=2021.75, the MOL simulation start date.

FIG. 6A illustrates an HK plot for MOL eNSSK Control Locus, which is identical in size and structure to the BOL locus. In the illustrated example of FIG. 6A, the eNSSK MOL locus is rotated to maintain alignment with the MOL line of orbit nodes, with maximal eccentricity 350 micros at the axis poles and minimal eccentricity 0 micros at the axis centroid.

FIG. 6B illustrates an HK plot for MOL EISK Control Locus. In the illustrated example of FIG. 6B, the EISK MOL locus is circular with radius 200 micros, which corresponds to the semi-minor axis of the BOL EISK ellipse. The MOL semi-major axis has been reduced from the maximal uncontrolled value of 350 micros to 200 micros in keeping with the circular sun synchronous strategy.

Figure 7A:
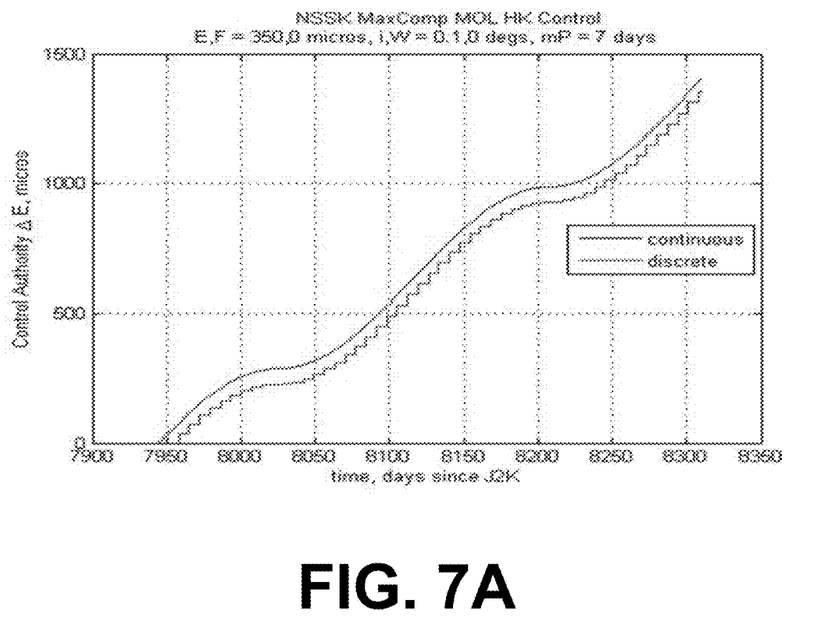
FIG. 7A illustrates a control authority plot for MOL eNSSK.

FIG. 7A illustrates a control authority plot for MOL eNSSK. In the illustrated example of FIG. 7A, the cumulative annual MOL eNSSK continuous and discrete ΔE eccentricity control authorities are identical to the BOL value, ~1400 micros, with mean per-weekly-maneuver ΔE authority of ~27 micros/maneuver.

Figure 7B:
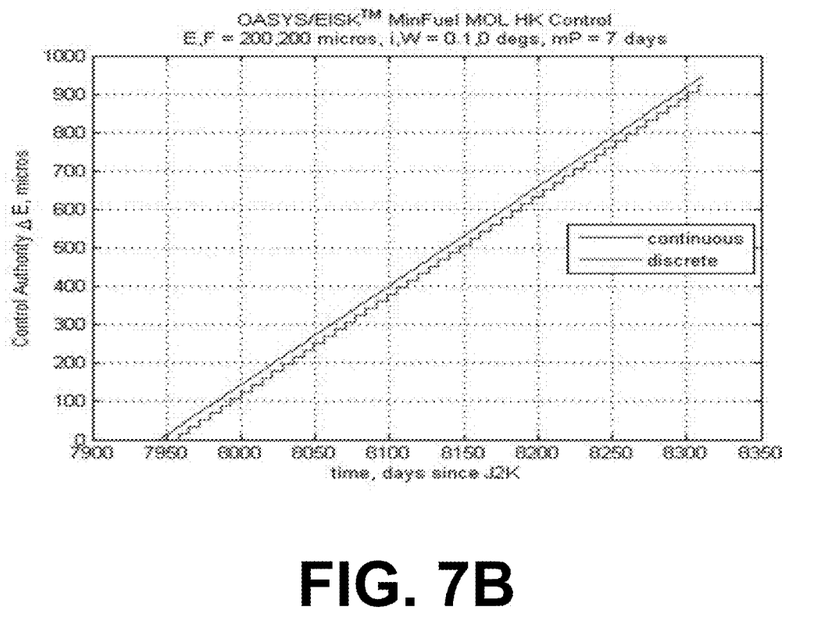
FIG. 7B illustrates a control authority plot for MOL EISK.

FIG. 7B illustrates a control authority plot for MOL EISK. In the illustrated example of FIG. 7B, the cumulative annual EISK continuous and discrete ΔE eccentricity control authorities are increased to ~950 micros from the BOL values, with mean per-weekly-maneuver ΔE authority of ~18 micros/maneuver. The EISK/eNSSK ΔE control authority demand ratio is 68%. But since eNSSK is not intended for equatorial operations, the relevant statistic for comparison is the EISK.MOL/EISK.BOL control demand ratio of 950/600=1.58. Sun-synchronous, circular, MOL equatorial orbit control costs 58% more than the eccentric BOL inclined orbit control from which it is descended.

Figure 8A:
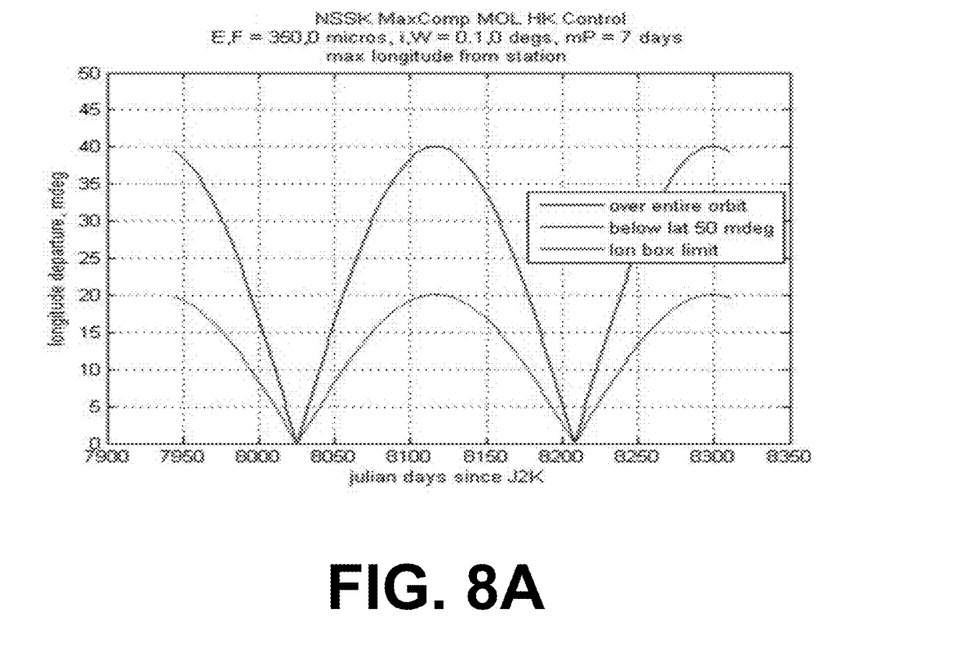
FIG. 8A illustrates a longitude limit plot for MOL eNSSK.

FIG. 8A illustrates a longitude limit plot for MOL eNSSK. Referring to FIG. 8A, although not intended for equatorial operations, eNSSK nevertheless provides 10 mdeg of MGL control margin, as illustrated by the blue trace, within the 50 mdeg longitude control radius year round. The maximum longitude departures for latitudes below 50 mdeg, as illustrated by the green trace, are not relevant for equatorial operations.

Figure 8B:
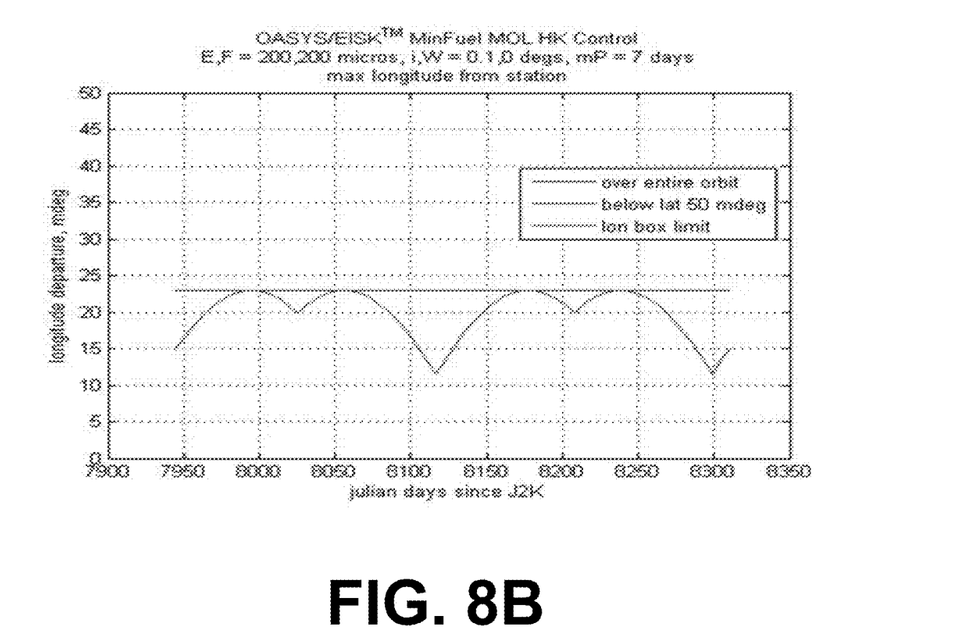
FIG. 8B illustrates a longitude limit plot for MOL EISK.

FIG. 8B illustrates a longitude limit plot for MOL EISK. In the illustrated example of FIG. 8B, EISK is configured as circular sun synchronous station keeping (SSSK) and provides 27 mdeg of MGL control margin year round, identical to the EISK BOL year round control margin.

In conclusion regarding the MOL eccentricity control, the eNSSK max compensation control provides 10 mdeg of MGL control margin year-round. The margin is small, but could in fact be supported by the Long/Drift Station Keeping MGL control algorithm with a 7 day maneuver period at longitude stations for which tri-axiality is less than, say, 0.75 mdeg/day$^2$ in magnitude. The EISK min fuel sun synchronous control as configured for this MOL equatorial orbit scenario provides a year-round minimum of 27 mdeg MGL control radius margin for the 50 mdeg radius slot. The annual eccentricity authority demanded by the control is 950 micros, 58% greater than the demand of its antecedent BOL EISK control. Decreasing the EISK circular sun synchronous control locus semi-axes from 200 micros to 100 micros increases the year-round minimum MGL control margin from 25 mdeg to 32.5 mdeg at the cost of increasing the eccentricity control authority demand from 950 micros to 1250 micros, a 32% increase over the control authority demand for the 200 micro sun synchronous control radius.

As stated above, NSSK eccentricity control for inclined orbit operations may be instantiated as a special limit-value case of EISK eccentricity-inclination-sun synchronous control. NSSK may be emulated as EISK configured with control locus semi-major axis aligned with the orbit line of nodes and having magnitude equal to the satellite's natural (uncontrolled) eccentricity radius, and with the control locus semi-minor axis maximally controlled to magnitude zero. Relaxing the maximum compensation control for inclined operations to admit a semi-minor axis magnitude commensurate with the sun synchronous control radius one would use for equatorial operations with the same vehicle offers significant control authority demand savings without compromising MGL control for BOL to MOL and for MOL to EOL inclined orbit operations.

MOL equatorial sun synchronous operations may be achieved seamlessly from BOL inclined operations by annual reduction of the EISK semi-major axis from its BOL uncontrolled maximum value to the MOL sun synchronous radius while holding the semi-minor axis at the MOL sun synchronous radius throughout. The MOL to EOL evolution of the semi-major axis magnitude would retrace the BOL to MOL semi-major axis values in ascending order. Optimization of the annual progression of EISK semi-major axis magnitudes may halve the eccentricity control fuel loading for a fixed vehicle lifespan, or alternatively, double the eccentricity fuel life span for a fixed fuel loading relative to the NSSK baseline.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the implementations discussed above focus on canceling the interfering signal, the envelope feedback interference reduction systems and techniques described above can be used to enable cancel each signal individually so that both signals can be processed allowing for a blind dual-carrier process to maximize data throughput on an RF system, or to allow characterize and capture, but not cancel the interfering signal for real-time or post process analysis. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of eccentricity control for a geosynchronous satellite having a geosynchronous orbit and an orbit line of nodes, the method comprising:
   setting a schedule for eccentricity control of the geosynchronous orbit using a two-dimensional eccentricity vector ellipse describing target eccentricity vector components over an annual period, each of the eccentricity vector components indicating a magnitude and direction for eccentricity vectors from the geosynchronous satellite to a perigee of the geosynchronous orbit;
   defining a plurality of parameters for the two-dimensional eccentricity vector ellipse including
      a centroid for a control locus, the control locus defining the target eccentricity vector components for the eccentricity vector ellipse in two-dimensional space,
      a semi-major axis and a semi-minor axis of the control locus determining an elliptical shape of the two-dimensional eccentricity vector ellipse, the semi-major axis of the control locus aligning with the orbit line of nodes and defining a maximum natural uncontrolled eccentricity of the geosynchronous orbit; and
   transmitting operational commands to the geosynchronous satellite for eccentricity control based on the schedule and the two-dimensional eccentricity vector ellipse, the operational commands defining maneuvers and inter-maneuver uncontrolled eccentricity coast segments to maintain a geodetic longitude of the geosynchronous satellite within a predefined distance from a station longitude.

2. The method of claim 1, wherein the predefined distance is 50 milli-degrees.

3. The method of claim 1, wherein the eccentricity control is an eccentricity-inclination-sun synchronous control.

4. The method of claim 1, wherein the plurality of parameters comprises setting elements [h,k] of the centroid at zero micros.

5. The method of claim 1, wherein defining the plurality of parameters comprises setting the semi-major axis of the control locus at 350 micros and the semi-minor axis of the control locus at 0 micros for a maximum compensation control using Node-Synchronous Station Keeping (NSSK).

6. The method of claim 1, wherein defining the plurality of parameters comprises setting the semi-major axis at 350 micros and the semi-minor axis at 200 micros for a minimum fuel control using Orbit Analysis System/Eccentricity-Inclination-Synchronous-Station-Keeping (EISK) beginning-of-life (BOL) inclined orbit scenario.

7. The method of claim 1, wherein defining the plurality of parameters comprises setting the semi-major axis at 200 micros and the semi-minor axis at 200 micros for a minimum fuel control using EISK middle-of-life (MOL) equatorial orbit scenario.

8. The method of claim 1, wherein the geodetic longitude of the geosynchronous satellite is maintained within a predefined distance from a station longitude for a specified range of near-equatorial latitudes.

9. An apparatus for eccentricity control of a geosynchronous satellite having a geosynchronous orbit and an orbit line of nodes, the apparatus comprising:
    means for setting a schedule for eccentricity control of the geosynchronous orbit using a two-dimensional eccentricity vector ellipse describing target eccentricity vector components over an annual period, each of the eccentricity vector components indicating a magnitude and direction for eccentricity vectors from the geosynchronous satellite to a perigee of the geosynchronous orbit;
    means for defining a plurality of parameters for the two-dimensional eccentricity vector ellipse including
        a centroid for a control locus, the control locus defining the target eccentricity vector components for the eccentricity vector ellipse in two dimensional space,
        a semi-major axis and a semi-minor axis of the control locus determining an elliptical shape of the two-dimensional eccentricity vector ellipse, the semi-major axis of the control locus aligning with the orbit line of nodes and defining a maximum natural uncontrolled eccentricity of the geosynchronous orbit; and
    means for transmitting operational commands to the geosynchronous satellite for eccentricity control based on the schedule and the two-dimensional eccentricity vector ellipse, the operational commands defining maneuvers and inter-maneuver uncontrolled eccentricity coast segments to maintain a geodetic longitude of the geosynchronous satellite within a predefined distance from a station longitude.

10. The apparatus of claim 9, wherein the means for defining the plurality of parameters comprises
    means for setting elements [h,k] of the centroid of the control locus at zero micros.

11. The apparatus of claim 9, wherein the means for defining the plurality of parameters comprises
    means for setting the semi-major axis of the control locus at 350 micros and the semi-minor axis of the control locus at 0 micros for a maximum compensation control using Node-Synchronous Station Keeping (NSSK).

12. The apparatus of claim 9, wherein the means for defining the plurality of parameters comprises
    means for setting the semi-major axis of the control locus at 350 micros and the semi-minor axis of the control locus at 200 micros for a minimum fuel control using Orbit Analysis System/Eccentricity-Inclination-Synchronous-Station-Keeping (EISK) beginning-of-life (BOL) inclined orbit scenario.

13. The apparatus of claim 9, wherein the means for defining the plurality of parameters comprises
    means for setting the semi-major axis of the control locus at 200 micros and the semi-minor axis of the control locus at 200 micros for a minimum fuel control using EISK middle-of-life (MOL) equatorial orbit scenario.

14. The apparatus of claim 9 wherein the geodetic longitude of the geosynchronous satellite is maintained within a predefined distance from a station longitude for a specified range of near-equatorial latitudes.

15. A non-transitory computer-readable storage medium storing a computer program for eccentricity control of a geosynchronous satellite having a geosynchronous orbit and an orbit line of nodes, the program comprising executable instructions that cause a computer to:
    set a schedule for eccentricity control of the geosynchronous orbit using a two-dimensional eccentricity vector ellipse describing target eccentricity vector components over an annual period, each of the eccentricity vector components indicating a magnitude and direction for eccentricity vectors from the geosynchronous satellite to a perigee of the geosynchronous orbit;
    define a plurality of parameters for the two-dimensional eccentricity vector ellipse including
        a centroid for a control locus, the control locus defining the target eccentricity vector components for the eccentricity vector ellipse in two-dimensional space,
        a semi-major axis and a semi-minor axis of the control locus determining an elliptical shape of the two-dimensional eccentricity vector ellipse, the semi-major axis of the control locus aligning with the orbit line of nodes and defining a maximum natural uncontrolled eccentricity of the geosynchronous orbit; and
    transmit operational commands to the geosynchronous satellite for eccentricity control based on the schedule and the two-dimensional eccentricity vector ellipse, the operational commands defining maneuvers and inter-maneuver uncontrolled eccentricity coast segments to maintain a geodetic longitude of the geosynchronous satellite within a predefined distance from a station longitude.

16. The non-transitory computer-readable storage medium of claim 15, wherein the executable instructions that cause the computer to define the plurality of parameters comprises executable instructions that cause the computer to
    set elements [h,k] of the centroid of the control locus at zero micros.

17. The non-transitory computer-readable storage medium of claim 15, wherein the executable instructions that cause the computer to define the plurality of parameters comprises executable instructions that cause the computer to
    set the semi-major axis of the control locus at 350 micros and a control locus semi-minor axis at 0 micros for a maximum compensation control using Node-Synchronous Station Keeping (NSSK).

18. The non-transitory computer-readable storage medium of claim 15, wherein the executable instructions that cause the computer to define the plurality of parameters comprises executable instructions that cause the computer to
    set semi-major axis of the control locus at 350 micros and a control locus semi-minor axis at 200 micros for a minimum fuel control using Orbit Analysis System/Eccentricity-Inclination-Synchronous-Station-Keeping (EISK) beginning-of-life (BOL) inclined orbit scenario.

19. The non-transitory computer-readable storage medium of claim 15, wherein the executable instructions that cause the computer to define the plurality of parameters comprises executable instructions that cause the computer to
    set the semi-major axis of the control locus at 200 micros and a control locus semi-minor axis at 200 micros for a minimum fuel control using EISK middle-of-life (MOL) equatorial orbit scenario.

20. The non-transitory computer-readable storage medium of claim 15, wherein the geodetic longitude of the geosynchronous satellite is maintained within a predefined distance from a station longitude for a specified range of near-equatorial latitudes.

* * * * *